O. J. SCHOENBORN.
ANTISKID ATTACHMENT FOR VEHICLES.
APPLICATION FILED OCT. 22, 1920.

1,388,066.

Patented Aug. 16, 1921.

WITNESSES.
Leroy A. Kauffman.
B. F. Garney

Inventor
OTTO J. SCHOENBORN.
By Richard B. Owens.
Attorney

UNITED STATES PATENT OFFICE.

OTTO J. SCHOENBORN, OF ST. JOSEPH, MISSOURI.

ANTISKID ATTACHMENT FOR VEHICLES.

1,388,066.   Specification of Letters Patent.   Patented Aug. 16, 1921.

Application filed October 22, 1920. Serial No. 418,662.

*To all whom it may concern:*

Be it known that I, OTTO J. SCHOENBORN, a citizen of the United States, residing at St. Joseph, in the county of Buchanan and State of Missouri, have invented certain new and useful Improvements in Antiskid Attachments for Vehicles, of which the following is a specification.

This invention relates to anti-skid attachments for vehicles, and aims primarily to provide a positive means for preventing skidding of the wheels.

The device of this invention is especially adapted for use with vehicles which require skid chains for prolonged periods, such, for instance, as vehicles used in cold climates or in traversing muddy thoroughfares; the character of this invention, however, is such that it may also be conveniently used with any type of vehicle where skid chains are used, since the device may be quickly attached to or removed from the wheels.

Figure 1:
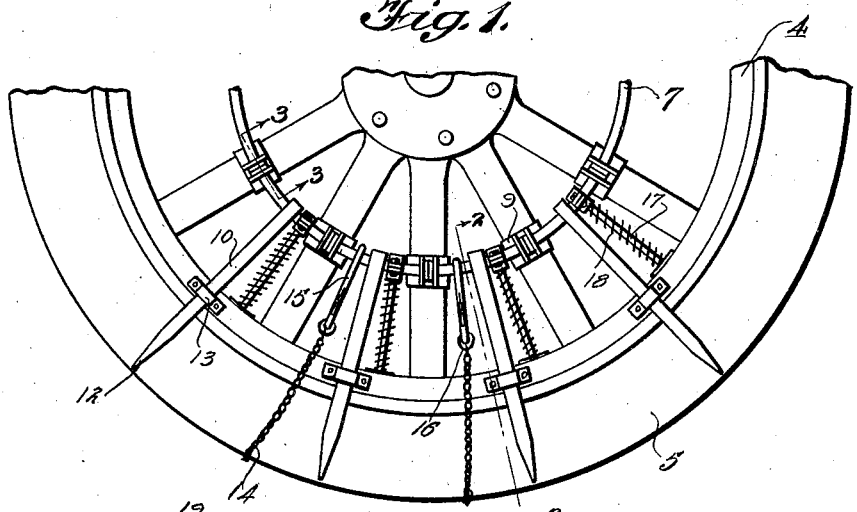
Figure 2:
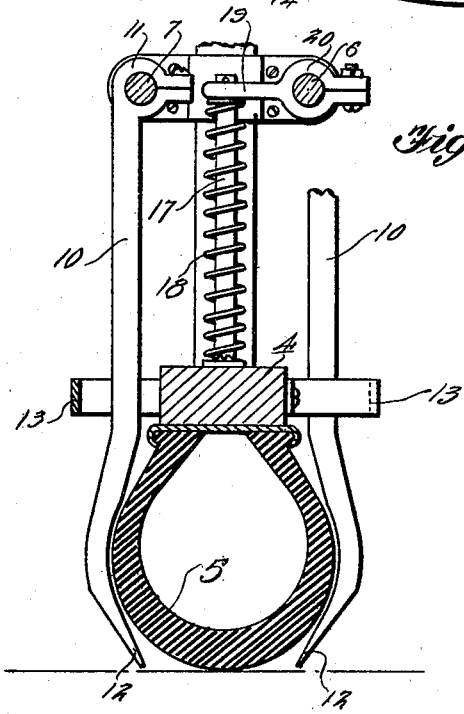
Figure 3:
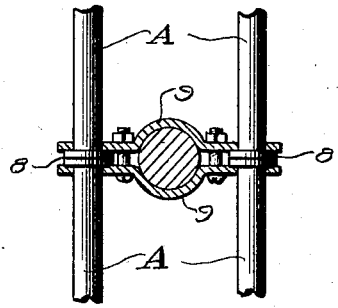

The above and other objects of this invention will be in part described and in part understood from the following description of the present preferred embodiment of the invention taken in connection with the accompanying drawings, wherein:

Figure 1, is a fragmentary side elevational view of a vehicle wheel embodying my invention, Fig. 2, is a sectional view taken on the line 2—2 of Fig. 1, and looking in the direction of the arrows, and Fig. 3, is a sectional view taken on the line 3—3 of Fig. 1.

In the drawings, a wheel 4 of the usual construction is shown which has associated therewith a rubber tire 5.

The invention consists of a pair of rings 6 and 7, constituting inner and outer rings respectively, and are arranged on opposite sides of the wheel spokes as shown to advantage in Fig. 2. Each ring comprises a plurality of sections, such as indicated at A in Fig. 3, each section having the ends thereof enlarged to provide annular flanges 8. The sections are rotatably mounted in straps 9 which are bolted onto the spokes of the wheel, these straps holding the enlarged ends of the segments together. It is apparent that the straps 9 may be clamped on the spokes at any desired point and are adjustable for an obvious purpose.

Radiating from the rings 6 and 7 are teeth 10, each of which consists of a solid rod, one end of which is formed to provide a split collar 11, which detachably engages one of the said rings 6 or 7. The opposite end of each tooth tapers to a point as indicated at 12, and terminates on a line slightly below the tread surface of the tire 5, so that the tooth will be held out of engagement from the road of travel during the normal movement of the vehicle wheel. However, should the wheel skid laterally, the lateral flexure of the tire will cause either the inner or outer series of teeth to grip the road, dependent upon the direction in which the wheel moves. Abutment loops 13 are mounted upon the sides of the wheel felly and receive the teeth 10 therethrough in a manner shown in Figs. 1 and 3. These loops limit movement of the teeth 10 laterally of the tire.

Skid chains 14 are mounted over the tire 5 and are held in engagement with the rings 6 and 7 by snap hooks 15. Each hook is engaged with a ring 16 carried by the chains so as to hold the latter snugly in engagement with the tire in an obvious manner, since the snap hooks will be at all times retained in their innermost positions by the rings 6 and 7. The arrangement of the skid chains shown in Fig. 1 of the drawings, is merely illustrative since any conventional type of chains may be used.

Upstanding from the inner periphery of the felly 4 are rods 17, one end of each of which is detachably connected to the felly while its opposite end terminates between the rings 6 and 7. A coil spring 18 encircles each of said rods and is engaged at its upper end by a tongue 19 which extends laterally from a split collar 20. These split collars are detachably secured to the segments of the rings 6 and 7 to be operated simultaneously with the movement of the segments. Consequently lateral pressure on the teeth 10 will impart a rotative movement to the segments A and thereby cause the springs 18 to be flexed through the collars 20 and tongues 19. In this way shock will be absorbed from the teeth and the latter retracted to their positions by the expansive action of the springs. Suitable pins are arranged through the rods 17 to prevent the tongues 19 from sliding therefrom.

It is apparent that the chains 14 may be completely removed when desired without in any way disturbing the utility of the teeth 10. Moreover, the entire device may be quickly attached to, or detached from, the wheel, although this would not be necessary since removal of the chains only would permit normal use of the tires over the road of travel without causing the latter to prematurely wear out, as is frequently the case where tire chains are used to a considerable extent. Various changes may be made in the details of this invention and the arrangement of parts without departing from the scope thereof.

What is claimed is:

An anti-skid device for vehicle wheel tires including rings consisting of jointed rotative segments carried by the wheel, and teeth carried by said segments and adapted to engage the road of travel, when said wheels move laterally, thereby rotating said segments, and means operable by movement of said segments to return the teeth to their normal positions when lateral thrust on the tires is discontinued.

In testimony whereof I affix my signature in presence of two witnesses.

OTTO J. SCHOENBORN.

Witnesses:
D. REHM,
F. RITTER.